(12) United States Patent
Larsson (10) Patent No.: US 11,464,199 B2
(45) Date of Patent: Oct. 11, 2022

(54) END EFFECTOR OF A ROBOT ARM AND ARRANGEMENT FOR PERFORMING AN ANIMAL RELATED OPERATION

(71) Applicant: DELAVAL HOLDING AB, Tumba (SE)

(72) Inventor: Magnus Larsson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 60 days.

(21) Appl. No.: 16/618,280

(22) PCT Filed: May 30, 2018

(86) PCT No.: PCT/SE2018/050547
§ 371 (c)(1),
(2) Date: Nov. 29, 2019

(87) PCT Pub. No.: WO2018/222121
PCT Pub. Date: Dec. 6, 2018

(65) Prior Publication Data
US 2020/0146252 A1   May 14, 2020

(30) Foreign Application Priority Data
May 31, 2017   (SE) .................... 1750686-6

(51) Int. Cl.
*A01J 7/04*   (2006.01)
*A01J 5/017*   (2006.01)
*B25J 19/00*   (2006.01)

(52) U.S. Cl.
CPC ............... *A01J 7/04* (2013.01); *A01J 5/0175* (2013.01); *B25J 19/0058* (2013.01); *B25J 19/0075* (2013.01)

(58) Field of Classification Search
CPC .. A01J 7/04; A01J 5/0175; A01J 7/022; A01J 7/02; A01J 7/027; B25J 19/0058; B25J 19/0075
See application file for complete search history.

(56) References Cited

U.S. PATENT DOCUMENTS 4,805,559 A * 2/1989 Van der Lely ........ A01J 5/0175
                                                119/14.1
4,838,207 A * 6/1989 Bom ..................... A01J 5/0175
                                                119/14.02
(Continued)

FOREIGN PATENT DOCUMENTS

DE    10 20110 01404 A1    9/2012
DE       202013000544 U1 *  2/2013   ............ B25J 9/0009
(Continued)

OTHER PUBLICATIONS

International Search Report and Written Opinion, dated Jul. 18, 2018, from corresponding PCT application No. PCT/SE2018/050547.
(Continued)

*Primary Examiner* — Joshua D Huson
*Assistant Examiner* — Megan J Moroney
(74) *Attorney, Agent, or Firm* — Nixon & Vanderhye (57) ABSTRACT

An end effector of a robot arm that is configured to participate in an animal-related operation, where the end effector is comprised of an actuator and a housing that is provided with a first aperture at a first end portion, where the actuator participates in the animal related operation via the first aperture, and the housing is provided with a second aperture providing access to an interior of the housing, wherein a passage extends through the housing along at least part of (Continued)

the actuator, from the second aperture to the first aperture such that the housing may be flushed through for removing dirt.

14 Claims, 4 Drawing Sheets

(56) References Cited

U.S. PATENT DOCUMENTS

| | | | | |
|---|---|---|---|---|
| 5,678,506 | A * | 10/1997 | van der Berg | A01J 5/0175 119/14.18 |
| 5,718,186 | A * | 2/1998 | van der Lely | A01J 5/0175 119/14.03 |
| 6,044,793 | A | 4/2000 | Van Der Lely | |
| 6,189,486 | B1 * | 2/2001 | Lindholm | A01J 5/0175 119/14.02 |
| 6,213,051 | B1 | 4/2001 | Fransen | |
| 6,357,387 | B1 * | 3/2002 | Johannesson | A01J 5/0175 119/14.1 |
| 6,584,929 | B2 * | 7/2003 | van der Lely | A01J 5/0175 119/14.01 |
| 6,647,919 | B2 * | 11/2003 | Vijverberg | A01J 5/0175 119/14.08 |
| 7,278,370 | B2 * | 10/2007 | Van Den Berg | A01J 5/0175 119/14.08 |
| 8,393,362 | B1 * | 3/2013 | Hollerback | B25J 11/00 141/94 |
| 9,258,975 | B2 * | 2/2016 | Hofman | A01J 5/0175 |
| 9,426,966 | B2 | 8/2016 | Krone | |
| 9,545,078 | B1 * | 1/2017 | Yadin | A01J 5/017 |
| 9,848,576 | B2 | 12/2017 | Krone et al. | |
| 10,440,931 | B2 * | 10/2019 | Krone | A01J 5/0175 |
| 2009/0255362 | A1 * | 10/2009 | Barker | H01L 21/67742 74/490.01 |
| 2012/0055595 | A1 | 3/2012 | Schodowski | |
| 2012/0325153 | A1 * | 12/2012 | Mostert | A01J 5/007 119/14.02 |
| 2013/0074775 | A1 * | 3/2013 | Andersson | A01J 5/007 119/14.04 |
| 2014/0060436 | A1 * | 3/2014 | Krone | A01J 5/017 119/14.1 |
| 2015/0321362 | A1 * | 11/2015 | Nakanishi | B25J 21/00 277/500 |
| 2015/0351360 | A1 | 12/2015 | Hamerton et al. | |
| 2016/0295827 | A1 | 10/2016 | Axelsson et al. | |
| 2017/0042110 | A1 | 2/2017 | Krone | |

FOREIGN PATENT DOCUMENTS

| | | |
|---|---|---|
| EP | 0448132 A2 | 9/1991 |
| EP | 0647390 A2 | 4/1995 |

OTHER PUBLICATIONS

SE Search Report, dated Jan. 16, 2018, from corresponding SE application No. 1750686-6.

Office Action issued in Japanese Patent Application No. 2019-555022 dated May 6, 2022.

Soplan Elevage, DeLaval VMS V300 milking robot, Mar. 22, 2017(online), pp. 1-3, retrieved on Apr. 22, 2022, retrieved from the internet: <http://www.soplan-elevage.com/article_19_1_robot-de-traite-vms-v300-delaval_fr.html>.

* cited by examiner

END EFFECTOR OF A ROBOT ARM AND ARRANGEMENT FOR PERFORMING AN ANIMAL RELATED OPERATION

TECHNICAL FIELD

The invention relates to an end effector of a robot arm, and to an arrangement for performing an animal related operation.

BACKGROUND

On a modern farm, one or more animal related operations are performed utilising automated equipment comprising one or more robot arms. Such animal related operations may for instance be attachment of one or more teatcups to the teats of an animal, cleaning of one or more teats of an animal, performing an after-treatment of one or more teats of an animal, etc.

Such a robot arm may comprise an end effector arranged at an end thereof. The end effector is configured to participate in the animal related operation. The design of the end effector depends on the animal related operation to be performed. Some end effectors comprise an actuator which is configured to participate in the animal related operation by manipulating, holding, controlling, positioning, or releasing devices utilised for performing at least part of the animal related operation.

Automated equipment on a farm operates under conditions which may be more or less dirty. The automate equipment may be subjected to dirt in the form of e.g. dust, soil, and/or manure. Accordingly, the robot arm and the end effector are subjected to such dirt. The dirt will eventually spread to an interior of a housing of the end effector. Often, the housing of the end effector is provided with an aperture, through which the actuator directly, or indirectly, participates in the animal related operation. Such an aperture may provide access for dirt to spread into the interior of the housing.

U.S. Pat. No. 6,044,793 discloses an apparatus for automatically milking animals provided with one or more automatic milking robots, teatcups and milking compartments. The teatcups are disposed on a carrier of a milking robot arm so as to be in their inoperative position, inclined relative to the vertical and when being connected to a teat of an animal to be milked, the teatcups are moved from their inclined positions into substantially vertical positions. The carrier includes a box-shaped housing for each teatcup. The carrier forms an end effector of the milking robot arm. A withdrawing member, comprising a cylinder and a piston, forms part of an actuator of the end effector.

SUMMARY

It is an object to provide an end effector configured to participate in an animal related operation, which end effector is adapted to be used under dirty operating conditions.

According to an aspect, the object is achieved by an end effector of a robot arm. The end effector is configured to participate in an animal related operation, the end effector comprising an actuator and a housing. The actuator is arranged at least partially inside the housing. The housing extends along a first direction and is provided with a first aperture at a first end portion of the housing along the first direction. The actuator directly, or indirectly, participates in the animal related operation via the first aperture. The housing is provided with a second aperture providing access to an interior of the housing, wherein a passage extends through the housing along at least part of the actuator, from the second aperture to the first aperture.

Since the housing comprises a first aperture and a second aperture, and since a passage extends through the housing along the actuator, from the second aperture to the first aperture, the interior of the housing is able to be flushed through for cleaning of at least a portion of the interior of the housing and at least a portion of the actuator. Thus, dirt inside the housing is easily removable. As a result, the above mentioned object is achieved.

It has been realised by the inventor that providing access to an interior of a housing of an end effector such that it can be cleaned internally is a better way of avoiding dirt to negatively affect the operation of the end effector, than to attempt to seal the interior of the housing from dirt, which would have been the obvious strategy. Moreover, the inventor has realised that sealing the interior of the housing may cause problems with moisture inside the housing, and that providing both a first and a second aperture in the housing permits ventilation of the the interior of the housing to prevent problems with moisture therein.

The end effector and robot arm may form part of automated equipment configured to perform an animal related operation. Such animal related operations may for instance be attachment of one or more teatcups to the teats of an animal, cleaning of one or more teats of an animal, performing an after-treatment of one or more teats of an animal, cleaning of a milking parlour, etc. The actuator may be a hydraulic actuator, a pneumatic actuator, an electro-magnetic actuator, or similar device. The actuator may be controlled by a control system. The actuator may be arranged inside the housing to be protected from damage. For instance, the actuator thus, may be protected from animals stepping on, or kicking, the end effector. The housing may also protect the actuator from animal excrements. The actuator participates in the animal related operation via the first aperture, i.e. the actuator operates via the first aperture. For this purpose, e.g. a portion of the actuator may extend through the first aperture. Alternatively, a member actuated by the actuator may extend through the first aperture. The end effector is configured to participate in an animal related operation by performing at the least one step, operation, or sequence of a relevant animal related operation. The interior of the housing may be flushed through with a fluid, such as a cleaning liquid or a pressurised gas.

Herein the term an "inside" of the housing of the end effector and an "interior" of the housing of the end effector are used synonymously.

According to embodiments, the second aperture may be provided at a second end portion of the housing along the first direction, wherein the second end portion is arranged opposite to the first end portion seen along the first direction. In this manner, at least a portion of the inside of the housing may be flushed along the first direction.

According to embodiments, wherein the housing comprises a first side wall and an opposite second side wall extending at least partially between the first end portion and the second end portion of the housing, each of the first and second side walls, may be provided with at least one additional aperture providing access to the interior of the housing. In this manner, an interior of the end effector may be flushed also through the additional apertures. Thus, dirt may be thoroughly removed from the interior of the end effector. The inventor has realised that providing the housing of the end effector with a number of apertures, may facilitate cleaning the interior of the housing and of the actuator arranged therein. Again, this approach is based on the realisation that a partially open housing permitting flushing of the inside of the housing in order to remove dirt therefrom may be a better approach than attempting to seal the interior of the housing from dirt. Also, the provision of the additional apertures may provide for a thorough ventilation of the inside of the housing, e.g. in order to prevent moisture from damaging the actuator. The provision of the additional apertures may also provide for draining the housing after flushing of the interior of the housing with cleaning liquid. A number of apertures in the housing may facilitate draining irrespective of the orientation of the end effector.

According to embodiments, at least one of the additional apertures may be positioned alongside at least part of the actuator. In this manner, direct access may be provided to the actuator for removing dirt therefor via the at least one additional aperture.

According to embodiments, the end effector may comprise a nozzle arranged inside the housing, wherein the nozzle may be arranged for providing a fluid into the interior of the housing. In this manner, the interior of the housing may be flushed with the fluid from the interior of the housing, utilising the nozzle. A cleaning liquid or pressurised gas thus, may be applied inside the housing and may be directed to flush dirt and/or liquid from at least a portion of the interior of the housing.

According to embodiments, the nozzle may be arranged to direct a flow of fluid in a general direction towards the first aperture. In this manner, dirt removed from the inside of the housing and/or liquid may leave the housing via the first aperture, entrained with the fluid.

It is a further object to provide a method for operating an end effector, which end effector is adapted to be used under dirty operating conditions.

According to an aspect, the object is achieved by a method for operating an end effector of a robot arm, the end effector being configured to participate in an animal related operation and comprising an actuator and a housing. The actuator is arranged at least partially inside the housing. The housing extends along a first direction and is provided with a first aperture at a first end portion of the housing along the first direction. The actuator directly, or indirectly, participates in the animal related operation via the first aperture. The housing is provided with a second aperture providing access to an interior of the housing, wherein a passage extends through the housing along at least part of the actuator, from the second aperture to the first aperture. The end effector comprises a nozzle arranged inside the housing. The method comprises a step of:

providing a fluid into the interior of the housing via the nozzle.

Since the method provides a step of providing a fluid into the interior of the housing via the nozzle, the interior of the housing is able to be flushed through with a fluid for cleaning of at least a portion of the interior of the housing and at least a portion of the actuator. Thus, dirt inside the housing is easily removable. As a result, the above mentioned object is achieved.

According to a separate aspect, the object of providing an end effector configured to perform an animal related operation, which end effector is adapted to be used under dirty operating conditions, is achieved by an end effector of a robot arm. The end effector is configured to participate in an animal related operation, the end effector comprising an actuator and a housing. The actuator is arranged at least partially inside the housing. The housing is provided with a first aperture at a first end portion of the housing. The actuator directly, or indirectly, participates in the animal related operation via the first aperture. The end effector comprises a nozzle arranged inside the housing, wherein the nozzle is arranged for providing a fluid into the interior of the housing.

Since the housing is provided with a first aperture at a first end portion of the housing, and since a nozzle is arranged inside the housing, the nozzle being arranged for providing a fluid into the interior of the housing, the housing is cleanable from an inside of the housing. The fluid from the nozzle leaving the housing via the first aperture entraining dirt and/or liquid. As a result, the above mentioned object is achieved. The fluid may be a cleaning liquid or a pressurised gas. In the latter case the pressurised gas may be utilised for removing moisture from the interior of the housing.

It has been realised by the inventor that providing a nozzle inside a housing of an end effector such that it can be cleaned internally is a better way of avoiding dirt to negatively affect the operation of the end effector, than to attempt to seal the interior of the housing from dirt, which would have been the obvious strategy.

Embodiments discussed herein are not only applicable to the former aspect of the end effector, which relates to the provision of a first aperture and a second aperture in the housing of the end effector, but also to this latter aspect of the end effector, which relates to the provision of a first aperture in the housing of the end effector and a nozzle arranged inside the housing. Generally, end effectors according to both aspects may utilise features of the various embodiments discussed herein. Accordingly, the features of, and advantages discussed in the following detailed description may relate to both aspects of the end effector as readily understood by the person skilled in the art.

Related to the separate aspect, it is an object to provide a method for operating an end effector, which end effector is adapted to be used under dirty operating conditions.

The object is achieved by a method for operating an end effector of a robot arm. The end effector is configured to participate in an animal related operation, the end effector comprising an actuator and a housing. The actuator is arranged at least partially inside the housing. The housing is provided with a first aperture at a first end portion of the housing. The actuator directly, or indirectly, participates in the animal related operation via the first aperture. The end effector comprises a nozzle arranged inside the housing. The method comprises a step of:

providing a fluid into the interior of the housing via the nozzle.

Since the method provides a step of providing a fluid into the interior of the housing via the nozzle, the interior of the housing is able to be flushed through with a fluid for cleaning of at least a portion of the interior of the housing and at least a portion of the actuator. Thus, dirt inside the housing is easily removable. As a result, the above mentioned object is achieved.

It is a further object to provide an arrangement for performing an animal related operation comprising an end effector configured to participate in the animal related operation, which end effector is adapted to be used under dirty operating conditions.

According to an aspect, the object is achieved in an arrangement for performing an animal related operation, comprising a robot arm and control system configured for controlling the robot arm. The robot arm comprises an end effector according to any one of aspects and/or embodiments discussed herein.

Thus, according to one implementation, the interior of the housing of the end effector is able to be flushed through from the second aperture to the first aperture, for cleaning of at least a portion of the interior of the housing and at least a portion of the actuator. As a result, the above mentioned object is achieved.

Also, according to a further implementation, the housing of the end effector is cleanable from an interior of the housing by the nozzle being arranged for providing a fluid into the interior of the housing, the fluid from the nozzle and dirt and/or liquid leaving the housing via the first aperture. As a result, the above mentioned object is achieved.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1A:
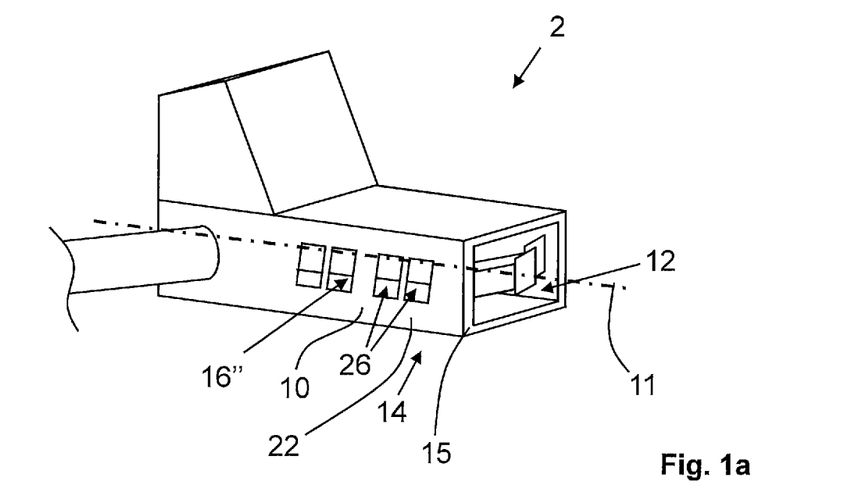
FIGS. 1a-1c show three views of an end effector according to embodiments.
Figure 1B:
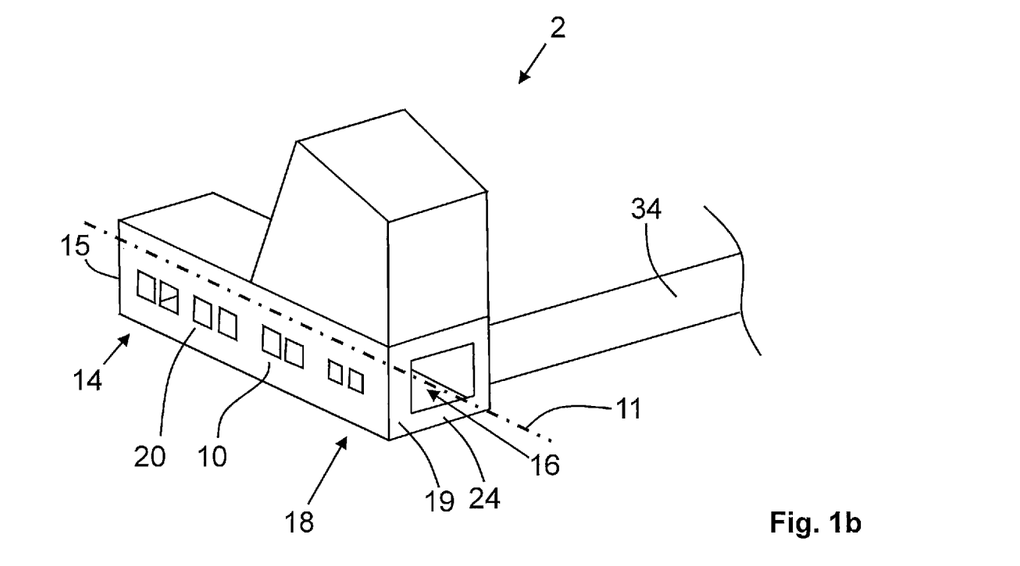
Figure 1C:
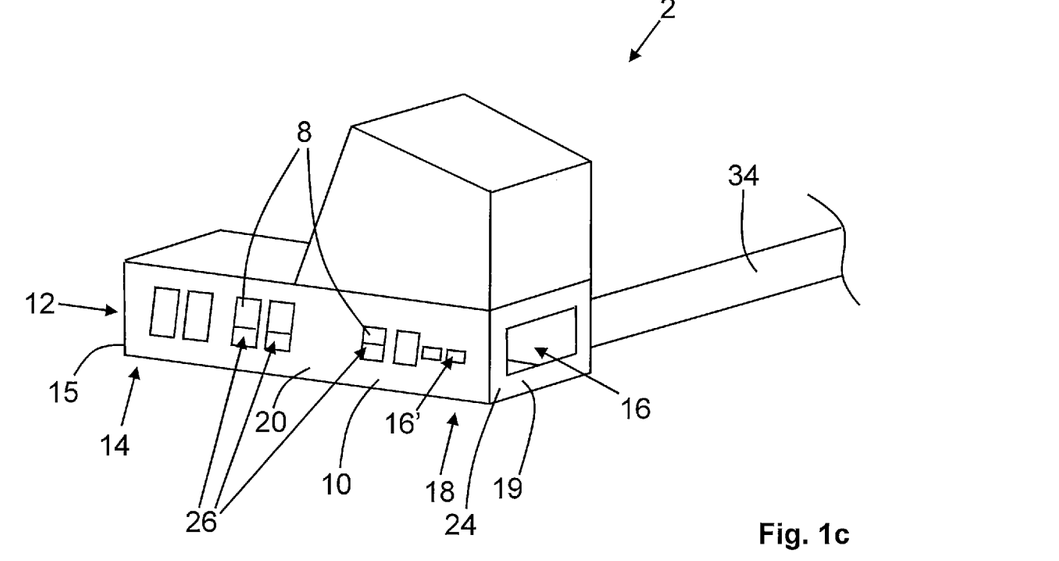

FIGS. 1a-1c show three views of an end effector 2 according to embodiments. The end effector 2 is arranged at an end of a robot arm 34. The end effector 2 is configured to participate in an animal related operation. Similarly, the robot arm 34 is configured to participate in the animal related operation. The robot arm 34 and the end effector 2 form part of an arrangement for performing the animal related operation.

The end effector 2 comprises a housing 10 and an actuator 8, see further below with reference to FIG. 2. The actuator 8 is arranged at least partially inside the housing 10. The actuator 8 is configured for moving, holding, releasing or otherwise controlling a device to be utilised for performing the animal related operation.

The housing 10 extends along a first direction 11. The housing 10 comprises a first end portion 14 seen along the first direction 11, and a second end portion 18 seen along the first direction 11. The second end portion 18 is arranged opposite to the first end portion 14 seen along the first direction 11. The first end portion 14 extends from a first end 15 of the housing 10 towards the second end portion 18. The second end portion 18 extends from a second end 19 of the housing 10 towards the first end portion 14.

The housing 10 is provided with a first aperture 12 at the first end portion 14. An interior of the housing 10 is in open communication with an ambient environment of the housing 10 via the first aperture 12. The first aperture 12 is provided for the actuator 8 to directly, or indirectly, participate in the animal related operation. That is, in order for the actuator 8 to directly participate in the animal related operation via the first aperture 12, a portion of the actuator 8 may extend through the first aperture 12. For instance, claws of a gripper or an electromagnet may extend through the first aperture 12. Alternatively, the actuator 8 may be arranged to indirectly participate in the animal related operation via the first aperture 12 by a member being actuated by the actuator 8 extending through the first aperture 12. For instance, a member comprising a cord connected to the actuator 8 may extend through the first aperture 12, see also FIG. 3, below.

The housing 10 is provided with a second aperture 16, 16', 16" providing access to an interior of the housing 10. According to some embodiments, the second aperture 16, 16' is provided at the second end portion 18 of the housing 10. According to some embodiments, the second aperture 16" may be arranged at the first end portion 14, or at a middle portion of the housing, in between the first and second end portions 14, 18. An interior of the housing 10 is in open communication with an ambient environment of the housing 10 via the second aperture 16, 16', 16".

According to embodiments, the housing 10 may comprise a first side wall 20 and an opposite second side wall 22 extending at least partially between the first end portion 14 and the second end portion 18 of the housing 10. The second aperture 16, 16' may be provided in the first or second side wall 20, 22, or between the first and second side walls 20, 22. In FIGS. 1b and 1c two exemplifying positions of the second aperture 16, 16' at the second end portion 18 of the housing 10, are shown.

The second aperture 16 may be provided between the first and second side walls 20, 22, i.e. at the second end 19 of the housing 10. With this position of the second aperture 16, the second aperture may be formed simply by a space in between the first and second side walls 20, 22, or alternatively, as in the shown embodiments, a rear wall 24 may extends between the first and second side walls 20, 22 at the second end portion 18 of the housing 10, and the rear wall 24 may be provided with the second aperture 16.

As an alternative to providing the second aperture between the first and second side walls 20, 22, the second aperture 16' may be provided in the first or second side wall 20, 22. In FIG. 1c a second aperture 16' in the first side wall 20 is shown.

In FIG. 1c an exemplifying position of the second aperture 16" at the first end portion 14, or middle portion of the housing 10 is shown. The second aperture 16" is provided in the second side wall 22 but may alternatively be provided e.g. in the second side wall 20.

Figure 2:
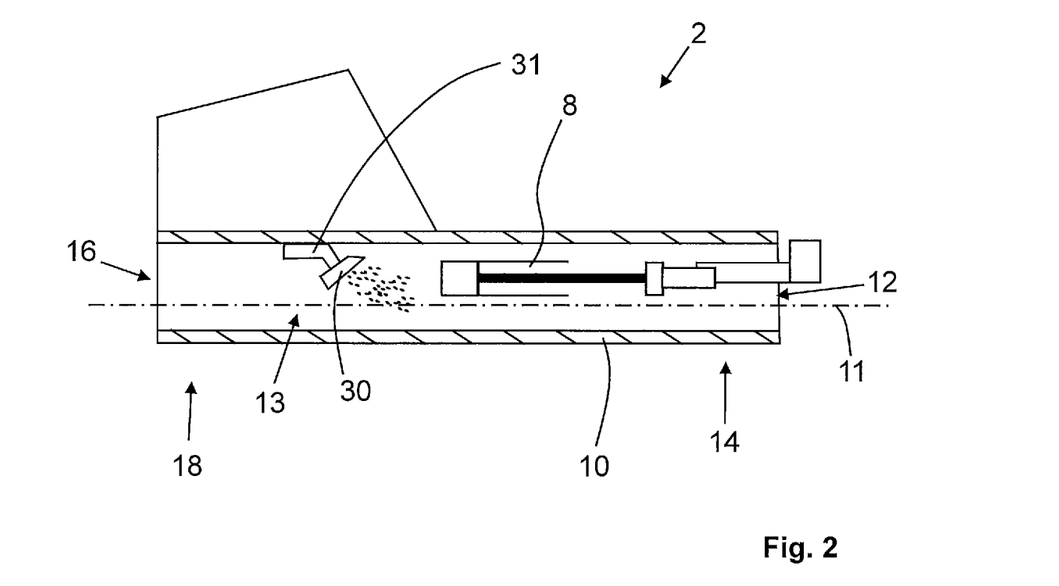
FIG. 2 illustrates a cross section through the end effector of FIGS. 1a-1c.

A passage extends through the housing 10 along at least part of the actuator 8, from the second aperture 16, 16', 16" to the first aperture 12, see FIG. 2. Due to the provision of the first and second apertures 12, 16, 16', 16" and the passage there between, the interior of the housing 10 may be flushed through with a fluid substantially along the first direction 11. Thus, dirt inside the housing 10 may be flushed out with the fluid. A farmer cleaning the end effector 2 may use e.g. a water hose, a high-pressure washer, or pressurised air for flushing through the housing 10. A jet of water or other cleaning liquid, or of pressurised air may be directed e.g. towards the second aperture 16, 16', 16" for flushing through at least a portion of the housing 10.

According to some embodiments, each of the first and second side walls 20, 22 may be provided with at least one additional aperture 26 providing access to the interior of the housing 10. An interior of the housing 10 is in open communication with an ambient environment of the housing 10 via the additional apertures 26. In the illustrated embodiments, there are provided at least four additional apertures 26 in each of the first and second side walls 20, 22. Thus, access for cleaning the interior of the end effector 2 is provided also via the additional apertures 26. Fluid, such as cleaning liquid from e.g. a water hose or a high-pressure washer, or pressurised air may be applied from both lateral sides of the end effector 2 through the additional apertures 26, and dirt may be thoroughly removed from the interior of the end effector 2. The cleaning liquid applied throughout the additional apertures 26 may drain out from the end effector 2 through one or both of the first and second apertures 12, 16, as well as through one or more of the additional apertures 26.

At least one of the additional apertures 26 may be positioned alongside at least part of the actuator 8, see FIG. 1c. Thus, at least part of the actuator 8 may be cleaned with a cleaning liquid and/or pressurised gas from an outside of the end effector 2 via the at least one additional aperture 26.

FIG. 2 illustrates a cross section through the end effector 2 of FIGS. 1a-1c along the first direction 11 of the end effector 2. The passage 13 extends through the housing 10 along at least part of the actuator 8, from the second aperture 16, to the first aperture 12.

As mentioned above, the actuator 8 is arranged at least partially inside the housing 10. The actuator 8 is configured for moving, holding, releasing, or otherwise controlling a device to be utilised for performing the animal related operation. In the illustrated embodiments, the actuator 8 comprises a hydraulic cylinder connected to a mechanism for gripping a device to be utilised when participating in the animal related operation. This however, is only one exemplifying embodiment of the actuator 8. The use of different kinds of actuators is foreseeable.

The actuator 8 is configured to receive a control signal from a control system and is connected to a source of energy. The control signal may be an electric signal, a pneumatic signal, or a hydraulic signal. The source of energy may be electricity, hydraulic pressure, or pneumatic pressure. When the control signal is received, the actuator 8 responds by converting supplied energy from the energy source into a movement, a holding force, a releasing force, or any other controlling of the device to be utilised for performing the animal related operation.

According to some embodiments, the end effector 2 comprises a nozzle 30 arranged inside the housing 10 of the end effector 2. A conduit 31 is connected to the nozzle 30 for conducting a pressurised fluid to the nozzle 30. Thus, the nozzle 30 is arranged for providing a fluid into the interior of the housing 10. The fluid may be a cleaning liquid comprising water and optionally a detergent, or a pressurised gas such as pressurised air.

More than one conduit 31 may connect to the nozzle 30 for conducting different kind of fluids to the nozzle. Alternatively, different kinds of fluids may be conducted via the conduit 31 to the nozzle 30. Alternatively, more than one nozzle, the nozzles being connect to different kinds of may fluids, may be provided inside the housing 10. Thus, e.g. the interior of the housing 10 first may be cleaned with a cleaning liquid and the blown dry with pressurised air.

The nozzle 30 may be a spray nozzle configured to produce a spray of liquid droplets. That is, when the pressurised cleaning liquid is supplied to the nozzle 30, a spray of liquid droplets of cleaning liquid is produced inside the housing 10. The supply of pressurised cleaning liquid to the nozzle 30 is switched on when cleaning of the interior of the housing 10 is to be performed, and switched off during ordinary operation of the end effector 2.

The nozzle 30 may be arranged to direct a flow of fluid in a general direction towards the first aperture 12. Thus, dirt removed from the inside of the housing 10 may leave the housing 10 via the first aperture 12 together with the fluid.

If a cleaning liquid is distributed inside the housing 10 via the nozzle 30, the nozzle 30 disperses the cleaning liquid into a spray in order to distribute the cleaning liquid over a portion of the interior of the housing 10. The spray produced by the nozzle 30 is a dynamic collection of droplets of the cleaning liquid. Suitably, the cleaning liquid is not only dispersed by the nozzle 30, but also ejected in a direction away from the nozzle 30 in order to produce a flushing effect of at least part of the interior of the housing 10 with the cleaning liquid. If a pressurised gas is distributed via the nozzle 30, the pressurised gas is directed in a direction determined by the nozzle 30.

More than one nozzle may be provided inside the housing 10, or the nozzle 30 may be provided with more than one nozzle opening, in order to achieve a distribution of fluid in more than one general direction inside the housing 10.

As illustrated, the nozzle 30 may be provided in embodiments of the end effector 2 wherein the housing 10 comprises the above discussed first and second apertures 12, 16, 16', 16".

However, as discussed above under the heading BACKGROUND, according to a separate aspect, the nozzle 30 may be utilised in an end effector 2, the housing 10 of which is not necessarily provided with the second aperture 16, 16', 16". This separate aspect is instead based on the provision of the nozzle 30 arranged inside the housing 10 and the housing 10 being provided with the first aperture 12 at the first end portion 14 of the housing 10.

An end effector 2 comprising a nozzle 30 according to any one of the aspect comprising both a first and a second aperture 12, 16, 16', 16", and the separate aspect not necessarily comprising a second aperture, may be utilised in the method 100 discussed below with reference to FIG. 5.

As mentioned above, the end effector 2 and robot arm 34 are configured to participate in an animal related operation.

According to some embodiments, the animal related operation may relate to handling of teatcups. In such embodiments, the actuator 8 may configured for holding a teatcup to the end effector 2 during attachment of the teatcup to a teat of an animal.

According to some embodiments, the animal related operation may relate to cleaning of teats of an animal. In such embodiments, the actuator 8 may be configured for holding teat cleaning equipment to the end effector 2 during cleaning of a teat of an animal.

According to some embodiments, the animal related operation may relate to after-treatment of teats of an animal. In such embodiments, the actuator 8 may be configured for holding after-treatment equipment to the end effector 2 during after-treating of a teat of an animal.

With reference to the above mentioned three different animal related operations, an end effector 2 comprising the actuator 8 may according to some embodiments be configured to participate in two or three of said animal related operations. Alternatively, an end effector 2 comprising the actuator 8 may according to some embodiments be dedicated for participating in only one of said animal related operations.

Figure 3:
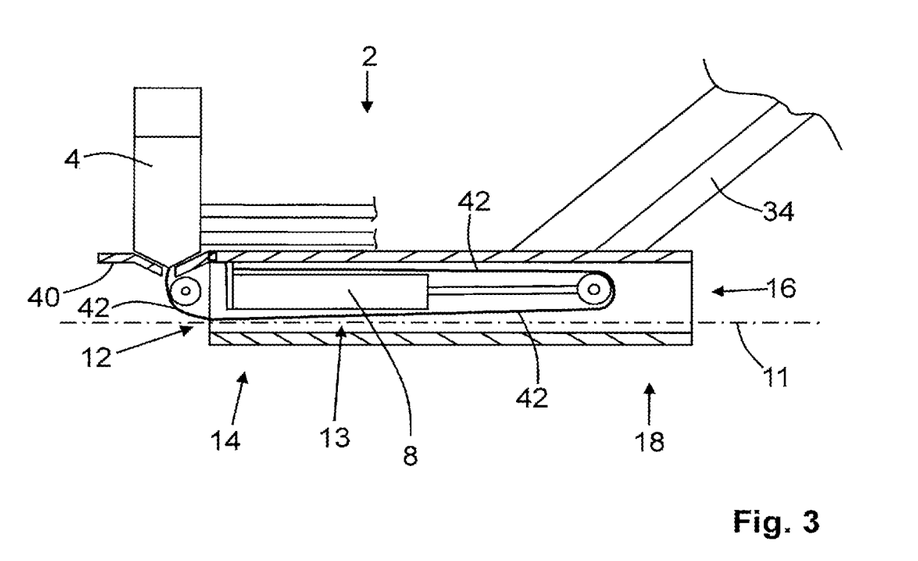
FIG. 3 illustrates a cross section through an end effector according to embodiments.

FIG. 3 illustrates a cross section through an end effector 2 according to embodiments. Again, the end effector 2 is configured to be arranged at an end of a robot arm 34, and the end effector 2 is configured to participate in an animal related operation. In the following, the main differences between the end effector 2 of these embodiments and the embodiments of FIGS. 1a-2, primarily will be discussed.

Again, a housing 10 of the end effector 2 extends along a first direction 11. The housing 10 comprises a first end portion 14 seen along the first direction 11, and a second end portion 18 seen along the first direction 11. The second end portion 18 is arranged opposite to the first end portion 14 seen along the first direction 11. An actuator 8 is arranged inside the housing 10. Again, the housing 10 is provided with a first aperture 12 at the first end portion 14, and with a second aperture 16 at the second end portion 18.

The end effector 2 forms a carrier for at least one teatcup 4. In FIG. 3 only one teatcup 4 is shown. Suitably, the end effector 2 may be configured for carrying two or four teatcups. The animal related operation relates to the attachment of at least one teatcup 4 to a teat of an animal. When not being used for milking, the at least one teatcup 4 is held against a carrier plate 40. This is achieved by an actuator 8 of the end effector 2 pulling the teatcup 4 against the carrier plate 40 via a cord 42. Accordingly, in these embodiments, the actuator 8 is arranged to indirectly participate in the animal related operation via the first aperture 12 by a member actuated by the actuator 8 extending through the first aperture 12. That is, in these embodiments, the member comprises a cord connected to the actuator 8. During milking, the teatcup 4 is released from the carrier plate 40 by the actuator 8 loosening the cord 42.

Again, a passage 13 extends through the housing 10 along at least part of the actuator 8, from the second aperture 16 to the first aperture 12. Thus, the interior of the housing 10 may be flushed through with a fluid substantially along the first direction 11 via the passage 13 extending through the housing 10 in order to remove dirt and/or liquid from inside the housing 10.

Figure 4:
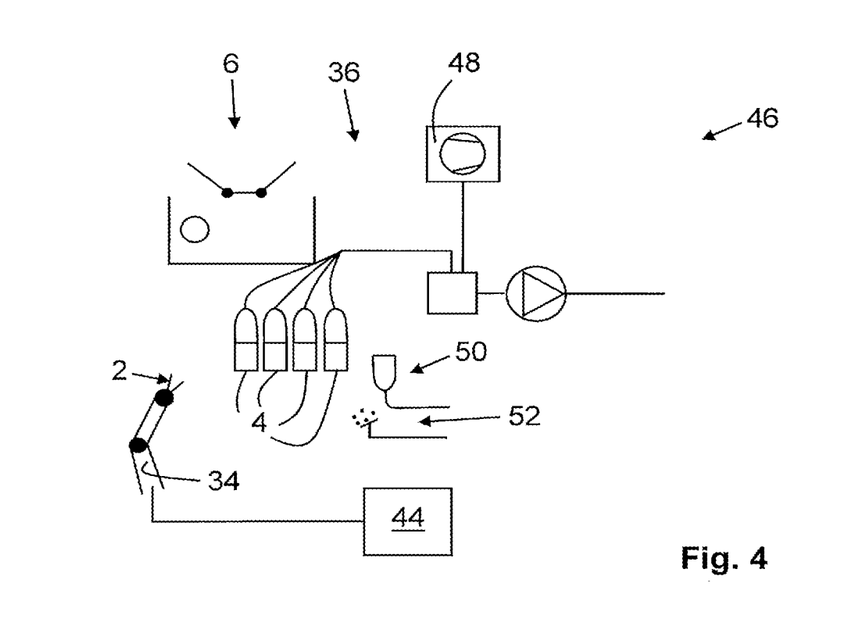
FIG. 4 illustrates an arrangement for performing an animal related operation.

FIG. 4 illustrates an arrangement 6 for performing an animal related operation. The arrangement 6 comprises a robot arm 34 and a control system 44 configured for controlling the robot arm 34. The robot arm 34 comprises an end effector 2 according to any one of aspects and/or embodiments discussed herein. Also the end effector 2 may be controlled by the control system 44. Thus, the end effector 2 and the robot arm 34 are configured to participate in the animal related operation.

In the exemplified embodiments, the animal related operation relates to automatically milking of animals. The arrangement 6 comprises a milking machine 36 comprising at least one teatcup 4, wherein the control system 44 is configured to control the robot arm 34 and the end effector 2 to attach at least one teatcup 4 to a teat of an animal.

Accordingly, the arrangement 6 for performing an animal related operation may be an automatic milking system, AMS, comprising the robot arm 34 for automatic attachment of teatcups 4 to the teats of animals. The milking machine 36 may be an ordinary vacuum milking machine utilising pulsating vacuum in the teatcups 4. The milking machine 36 is configured for extracting milk from the teats of animals standing in a milking parlour 46. The milking parlour 46 may be configured for housing one animal only as shown in FIG. 4, or the milking parlour may be configured for housing more than one animal simultaneously. The milking machine 36 comprises teatcups 4 and a vacuum system 48 operated in a known manner.

The arrangement 6 for performing an animal related operation may be configured for performing also other animal related operations than milking of animals. For instance, the arrangement 6 may comprise teat cleaning equipment 50. Thus, the end effector 2 may hold the teat cleaning equipment 50 during cleaning of the teats of an animal. The teat cleaning equipment 50 may comprise e.g. a teat cleaning cup or rotating foam rollers, both well known in the art. Additionally, or alternatively, the arrangement 6 may comprise after-treatment equipment 52. Thus, the end effector 2 may hold the after-treatment equipment 52 during after-treating of the teats of an animal. The after-treatment equipment 52 may comprise a spray nozzle for spraying a disinfectant, also known in the art.

The control system 44 comprises a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression calculation unit may represent a processing circuitry comprising a plurality of processing circuits, such as, e.g., any, some or all of the ones mentioned above. The control system may comprises a memory unit. The calculation unit is connected to the memory unit, which provides the calculation unit with, for example, the stored programme code and/or stored data which the calculation unit needs to enable it to do calculations. The calculation unit may also be adapted to storing partial or final results of calculations in the memory unit. The memory unit may comprise a physical device utilised to store data or programs, i.e., sequences of instructions, on a temporary or permanent basis. The control system 44 is connected inter alia to actuators and/or sensors in the end effector 2, the robot arm 34, and other controllable devices or monitoring devices of the arrangement 6 for performing an animal related operation.

Figure 5:
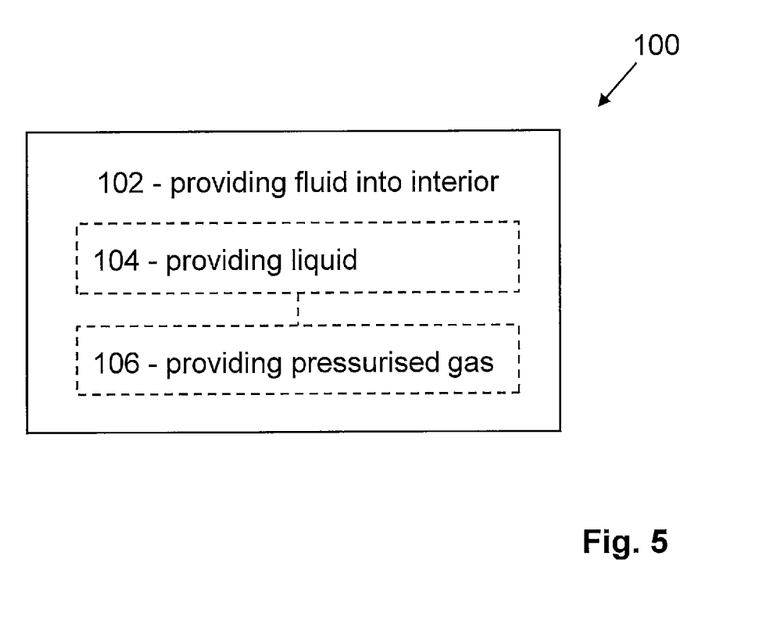
FIG. 5 illustrates a method for operating an end effector of a robot arm.

FIG. 5 illustrates a method 100 for operating an end effector of a robot arm, the end effector being configured to participate in an animal related operation and comprising an actuator and a housing. The end effector may be an end effector according to any one of aspects and/or embodiments discussed herein comprising a nozzle arranged inside the housing. The method 100 comprises a step of:

providing 102 a fluid into the interior of the housing of the end effector via the nozzle.

The discussion above related to FIG. 2 and the different embodiments of the nozzle, distribution of fluid inside the housing, different kinds of fluid, number of nozzles, etc. apply to the method 100 and different embodiments thereof. For instance, the step of providing 102 a fluid may comprise providing a cleaning liquid or a pressurised gas.

The step providing 102 a fluid may comprise a step of providing 104 a liquid followed by a step of providing 106 a pressurised gas. Thus, a cleaning liquid may first be utilised for flushing through at least part of the interior of the housing, the interior of the housing thereafter being cleaned or dried with pressurised air flushing through at least part of the housing.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An end effector (2) of a robot arm for carrying out an animal related operation, the end effector (2) comprising:
   an actuator (8); and
   a housing (10),
   wherein the actuator (8) is arranged at least partially inside the housing (10),
   wherein the housing (10) extends along a first direction (11) and is provided with a first aperture (12) at a first end portion (14) of the housing (10) along the first direction,
   wherein the actuator (8) is configured to operate through the first aperture (12) in order to carry out the animal related operation,
   wherein the housing (10) is provided with a second aperture providing access to an interior of the housing (10) for cleaning, draining and ventilation of the interior of the housing (10),
   wherein a passage (13) extends through the interior of the housing (10) along at least part of the actuator (8), from the second aperture to the first aperture (12),
   wherein the second aperture is provided at a second end portion (18) of the housing (10) along the first direction (11), the second end portion (18) being arranged opposite to the first end portion (14) seen along the first direction (11),
   wherein the housing (10) also includes a first side wall (20) and an opposing second side wall (22) extending at least partially between the first end portion (14) and the second end portion (18), and
   wherein each of the first and second side walls (20, 22) is provided with one or more additional apertures (26) each providing access to the interior of the housing (10) for cleaning, draining and ventilation of the interior of the housing (10).

2. The end effector (2) according to claim 1,
   wherein a rear wall (24) extends between the first and second side walls (20, 22) at the second end portion (18) of the housing (10), and
   wherein the second aperture (16) is located in said rear wall (24) for permitting access into the housing through the rear wall (24).

3. The end effector (2) according to claim 2, further comprising:
   a nozzle (30) arranged inside the housing (10),
   wherein the nozzle (30) is arranged to conduct a fluid into the interior of the housing (10), and
   wherein the nozzle (30) is arranged to direct a flow of fluid in a general direction towards the first aperture (12).

4. The end effector (2) according to claim 1, wherein at least one of the one or more additional apertures (26) is positioned alongside the at least part of the actuator (8).

5. The end effector (2) according to claim 4, further comprising:
   a nozzle (30) arranged inside the housing (10),
   wherein the nozzle (30) is arranged to conduct a fluid into the interior of the housing (10), and
   wherein the nozzle (30) is arranged to direct a flow of fluid in a general direction towards the first aperture (12).

6. The end effector (2) according to claim 1, further comprising:
   a nozzle (30) arranged inside the housing (10),
   wherein the nozzle (30) is arranged to conduct a fluid into the interior of the housing (10).

7. The end effector (2) according to claim 6, wherein the nozzle (30) is arranged to direct a flow of fluid in a general direction towards the first aperture (12).

8. The end effector (2) according to claim 6, wherein the nozzle (30) is a spray nozzle configured to produce a spray of liquid droplets.

9. The end effector (2) according to claim 1,
   wherein the animal related operation relates to handling of teatcups (4), the actuator (8) configured to hold a teatcup (4) during an attachment operation by the end effector for attaching the teatcup (4) to a teat of an animal.

10. The end effector (2) according to claim 1,
    wherein the animal related operation relates to cleaning of teats of an animal, the actuator (8) configured to hold teat cleaning equipment during a cleaning operation by the end effector for cleaning a teat of an animal.

11. The end effector (2) according to claim 1,
    wherein the animal related operation relates to after-treatment of teats of an animal, the actuator (8) configured to hold after-treatment equipment during an after-treating operation by the end effector for after-treating a teat of an animal.

12. An arrangement (6) for performing an animal related operation, comprising a robot arm (34) and a control system configured for controlling the robot arm (34), characterised in that the robot arm (34) comprises an end effector (2) according to claim 1.

13. The arrangement (6) for performing an animal related operation according to claim 12,
    wherein the animal related operation relates to automatically milking of animals,
    wherein the arrangement (6) comprises a milking machine (36) comprising at least one teatcup (4), and
    wherein the control system is configured to control the robot arm (34) and the end effector (2) to attach at least one teatcup (4) to a teat of an animal.

14. A method (100) for operating an end effector (2) of a robot arm (34) that is configured to carry out an animal related operation and where the end effector (2) is provided with a housing (10) and an actuator (8) housed therein, the actuator (8) arranged at least partially inside the housing (10), the housing (10) extending along a first direction (11) and provided with a first aperture (12) at a first end portion (14) of the housing (10) along the first direction (11), the actuator (8) configured to operate through the first aperture (12) to carry out the animal related operation, and the housing (10) provided with a second aperture providing access to an interior of the housing (10) for cleaning, draining and ventilation of the interior of the housing (10), the second aperture (16, 16') provided at a second end portion (18) of the housing (10) along the first direction (11), the second end portion (18) being arranged opposite to the first end portion (14) seen along the first direction (11), the housing (10) also including a first side wall (20) and an opposing second side wall (22) extending at least partially between the first end portion (14) and the second end portion (18), each of the first and second side walls (20, 22) provided with one or more additional apertures (26) each providing access to the interior of the housing (10) for cleaning, draining and ventilation of the interior of the housing (10), and a passage extends through the housing (10) from the second aperture to the first aperture (12) and along at least part of the actuator (8), the end effector (2) incorporating a nozzle (30) arranged inside the housing (10), the method (100) comprising:

providing (102) a fluid into the interior of the housing (10) via the nozzle (30).

\* \* \* \* \*